United States Patent [19]

Podgorski

[11] 4,129,851

[45] Dec. 12, 1978

[54] ELECTROACOUSTIC TRANSDUCER WITH A MAGNETOSTRICTIVE CORE

[75] Inventor: Jan Podgorski, Bensberg, Germany

[73] Assignee: INTERATOM, International Atomreaktorbau GmbH, Bensberg, Koeln, Germany

[21] Appl. No.: 760,221

[22] Filed: Jan. 18, 1977

[30] Foreign Application Priority Data

Jan. 29, 1976 [DE] Fed. Rep. of Germany ... 7602347[U]

[51] Int. Cl.[2] .............................................. H04B 13/00

[52] U.S. Cl. .......................................... 340/11; 310/26

[58] Field of Search ................. 340/8, 11; 174/13, 86; 310/26

[56] References Cited

U.S. PATENT DOCUMENTS

| | | | |
|---|---|---|---|
| 2,302,571 | 11/1942 | Ray | 310/26 UX |
| 2,452,085 | 10/1948 | Turner, Jr. | 340/11 |
| 2,489,977 | 11/1949 | Porter | 310/26 |
| 2,962,695 | 11/1960 | Harris | 340/11 X |
| 3,842,187 | 11/1974 | Barkan | 174/13 |

*Primary Examiner*—Harold Tudor

*Attorney, Agent, or Firm*—Herbert L. Lerner

[57] ABSTRACT

Electromechanical transducer includes a magnetostrictive core formed of a superimposed stack of individual plates disposed within a cylindrical protective sheath and having a coil wound thereon in longitudinal direction thereof, the plates having the shape of a circular disc formed with slots therein which leave open an area central to the disc that corresponds to the cross section of the coil and are disposed alternatingly offset from one another at a given angle so that the stack formed by the individual plates is in contact with the inner surface of the protective sheath over the entire periphery thereof.

3 Claims, 4 Drawing Figures

ELECTROACOUSTIC TRANSDUCER WITH A MAGNETOSTRICTIVE CORE

The invention of the instant application relates to an electroacoustic transducer having a core of magnetostrictive material formed of a superimposed stack of individual similar plates and having a coil wound thereon. Such transducers can be used both as sound transmitters as well as receivers and make use of the fact that, for example, a core of ferritic material having a coil wound thereon will increase in length i.e. expand, if a current flows through the coil and that, contrarily, if the core is mechanically stressed, for example, due to sonic or ultrasonic vibrations, a voltage will be induced in the coil.

In German Published Non-Prosecuted application DT-OS 24 14 936, assigned to the same corporate assignee as that of the instant application, the use of such transducers for monitoring liquid metal, which is employed for cooling certain nuclear reactors, with respect to the presence of bubbles in the liquid metal was proposed. The transducers suggested therein possessed a massive i.e. solid, core, and had coil which, depending upon the type of construction, were wound transversely or longitudinally on the core.

From U.S. Pat. No. 2,530,224, for example, wherein an underwater signal transmitter is described, it is also known to construct the core of magnetostrictive transducers individual plates, similarly to the core of a transformer.

It has, furthermore, been found that an annular or ring-shaped construction of the core is most advantageous for attaining the greatest possible sensitivity for sound receivers. Winding such ring-shaped cores with coils by the so-called "sewing method" is complex and accordingly costly.

It is an object of the invention to provide an electroacoustic transducer operating on the magnetostrictive principle for use especially as a sound receiver in liquid metals and other invironments located at high temperature. It is a further object, on the one hand, that the core of the transducer according to the invention should have an annular or ring-like shape especially suited for attaining high sensitivity and for uniform reception of sonic vibrations from a given radial direction and, on the other hand, that the core be relatively easy to assemble, so that coils prefabricated on forms can find use therewith. It is yet another object of the invention to provide such a transducer which is screened or shielded from interfering sound, which can be transmitted, for example, through the elements used for fastening the transducer.

With the foregoing and other objects in view, there is provided in accordance with the invention, an electromechanical transducer having a magnetostrictive core formed of a superimposed stack of individual plates disposed within a cylindrical protective sheath and having a coil wound thereon in longitudinal direction thereof, the plates having the shape of a circular disc formed with slots therein which leave open an area central to the disc that corresponds to the cross section of the coil and are disposed alternatingly offset from one another at a given angle so that the stack formed by the individual plates is in contact with the inner surface of the protective sheath over the entire periphery thereof.

In accordance with a further feature of the invention, the individual plates are alternatingly offset from one another by 180°. The plates can then be slid alternatingly from both sides into the hollow space in a prefabricated coil and lock together into a cylindrical structure that can be disposed within a cylindrical protective sheath and in close contact with the inner surface thereof.

In accordance with other alternate features of the invention, the shape of the plates individually is formed of three parallel circular segments, and either part of a circular ring connecting the segments to one another at a respective end thereof, or another circular segment disposed perpendicularly to the three parallel circular segments and connected thereto at a respective end thereof.

When used in liquidmetal, the leads of the transducer as well as the transducer per se require protection against mechanical damage and against corrosion for which, in the latter case, the aforementioned protective sheath is provided. The leads per se can, for example, be disposed in a tube and thereby extend to the transducer, however, such a tube has the undesirable characteristic of transmitting the structure-borne sound relatively well whereby the measurement results obtained with the transducer could become falsified.

In accordance with a concomitant feature of the invention, the transducer includes a tube secured to and forming an extension of the protective sheath, and leads for the transducer disposed in the tube, the tube being formed alternatingly of corrugated tube members having a relatively thin wall thickness and of tube members having a relatively great wall thickness. This series connection of tube sections having respectively smaller and greater masses is suited for quite considerably reducing the transmission of structure-borne sound or noise from the means for fastening the transducer to the transducer per se whereby, through suitable dimensioning of the tube members or sections, precise frequencies that are especially disturbing can be suppressed.

Other features which are considered as characteristic for the invention are set forth in the appended claims.

Although the invention is illustrated and described herein as embodied in electroacoustic transducer with magnetostrictive core, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
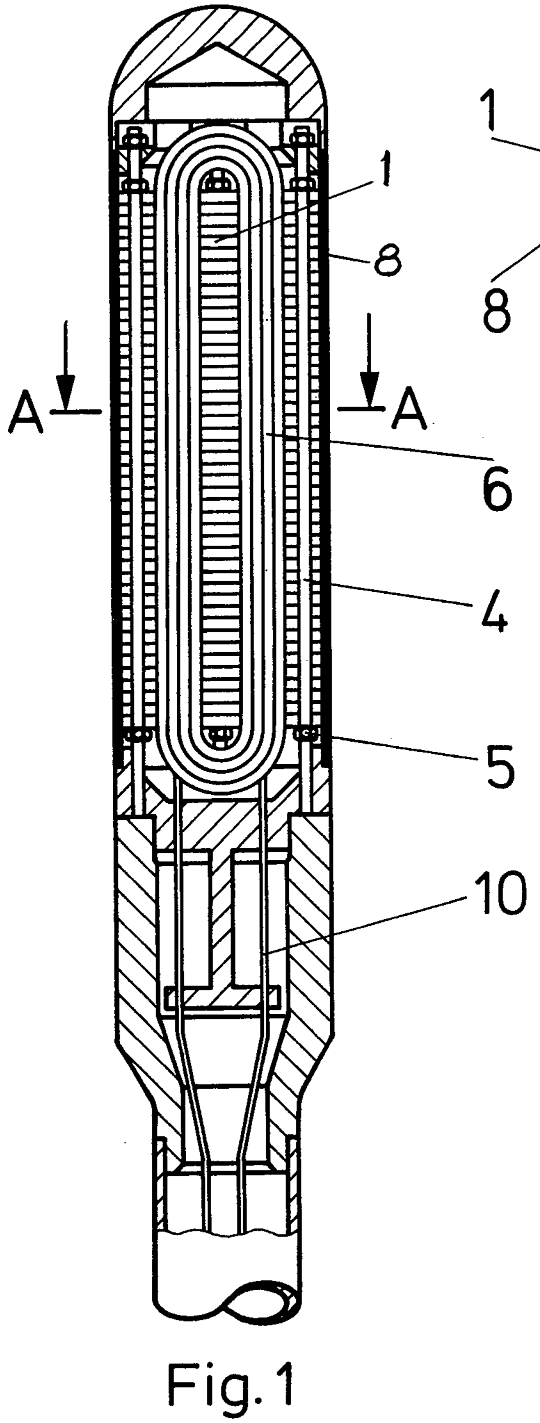
FIG. 1 is a longitudinal sectional view of the upper part of the transducer according to the invention, taken along a axial plane.
Figure 4:
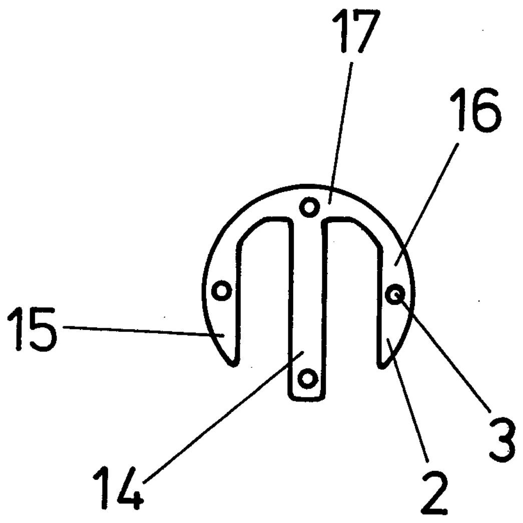
FIG. 4 is a plan view of one of the plates used for constructing the core of the magnetostrictive transducer of the invention.

Referring now to the drawing and first, particularly, to FIG. 1 thereof, there is shown the upper part of the transducer which is formed of a magnetostrictive core 1 that is formed of a multiplicity of plates 2 of a ferritic material stacked one on top of the other, one of the plates 2 being illustrated in FIG. 4. The individual plates 2 are formed with holes 3 through which threaded pins or bolts 4 are stuck for centering purposes and after the plates 2 have been shoved alternatingly in opposite direction in the hollow interior of a prefabricated coil 6. With the aid of nuts 5 screwed onto the threaded bolts 4, the packet of core plates 2 are held together and then connected to one another by longitudinal welding seams 7 (note FIG. 2), as well as finally machined or turned down in order to attain an accurate cylindrical shape. A coil 6 is wound longitudinally on the core 1 and is formed advantageously of metal-clad mineral-insulated cable when the transducer is to be inserted into liquid metals or other invironments located at high temperature. The transducer has a protective sheath 8, which is shrink-fitted thereon, for example, in order to achieve a good tight fit, and which is formed of a material, such as austenitic steel, for example, that is resistant to the action or effect of the medium or environment into which the transducer is introduced. To protect the leads 10 of the transducer, the protective sheath 8 has an extension in the form of a tube, made up alternatingly of individual corrugated tube members 11 of relatively thin wall thickness and additional tube members 12 having relatively thick walls and consequently being of greater mass than that of the tube members 11 and thereby damping any sound propagated through the protective tube 8. In order to confer the required rigidity to the tube altogether and in spite of the corrugated, readily flexible parts 11 thereof, the latter continue into i.e. are joined with, guide tubes 9 into which the leads 10 extend and are, in turn, held in ceramic sound insulators 13 therein.

Figure 2:
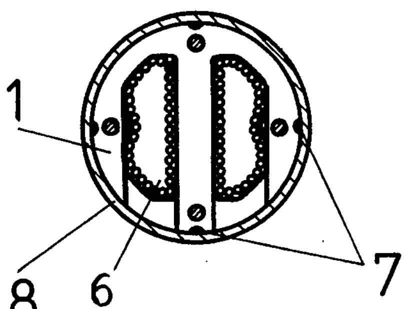
FIG. 2 is a cross-sectional view of FIG. 1 taken along the line A—A in direction of the arrows.
Figure 3:
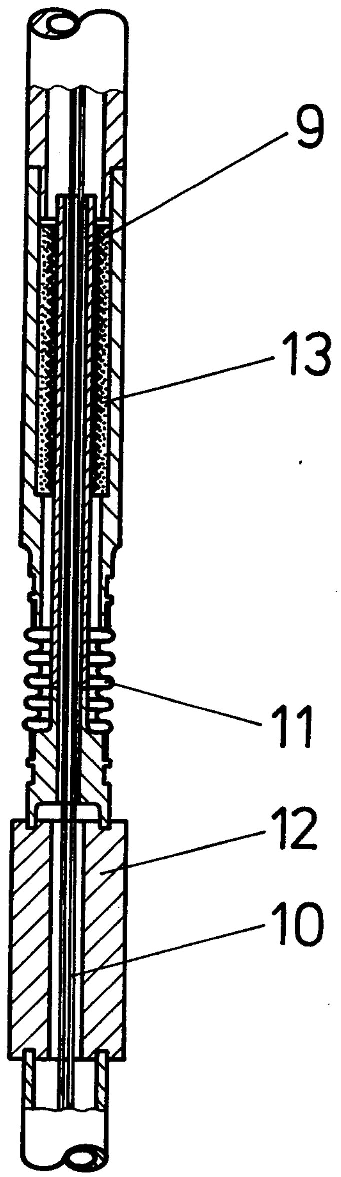
FIG. 3 is a view similar to that of FIG. 1 of the axial continuation i.e. the lower part, of the transducer showing the tube in which the leads are disposed, and the leads per se, in somewhat reduced scale.

The shape of the core cross-section shown in FIG. 2 is produced from the individual plates 2 having the shape shown in FIG. 4, the cross piece 14 of each of the plates 2 being inserted into the hollow space between the elongated portions of the turns of the longitudinally wound coil 6 that had been wound beforehand, in a time-saving manner, on a non-illustrated form, the cross piece 14 being alternatingly inserted from the one and from the other side of the hollow space of the coil 6 i.e. staggered or offset 180° from one another. The shape of the plate 2 is formed geometrically of three parallel segments 14, 15 and 16 of a circle and a circular sector or circular arc member 17 interconnecting them at a respective end thereof.

There are claimed:

1. Electromechanical transducer having a magnetostrictive core formed of a superimposed stack of individual plates disposed within a cylindrical protective sheath and having a coil wound thereon in longitudinal direction thereof, the improvement wherein the plates have the shape of a circular disc formed with slots therein which leave open an area central to said disc that corresponds to the cross section of the coil and are disposed alternatingly offset from one another by 180° so that the stack formed by the individual plates is in contact with the inner surface of the protective sheath over the entire circumference thereof, as seen in the axial direction, including a tube secured to and forming an extension of the protective sheath, and leads for the transducer disposed in said tube, said tube being formed alternatingly of corrugated tube members having a given wall thickness and of tube members having a greater wall thickness than said given wall thickness, and including a guide tube within said first-mentioned tube extending coaxially thereto and to said corrugated tube members for maintaining rigidity of said first-mentioned tube.

2. Transducer according to claim 1 wherein the shape of the plates individually is formed of three parallel circular segments, and part of a circular ring connecting said segments to one another at a respective end thereof.

3. Transducer according to claim 1 wherein the shape of the plates individually is formed by three parallel circular segments, and another circular segment disposed perpendicularly to said three parallel circular segments and connected thereto at a respective end thereof.

* * * * *